United States Patent
Prang et al.

(10) Patent No.: US 8,747,058 B2
(45) Date of Patent: Jun. 10, 2014

(54) ADJUSTING RING FOR A CHARGING DEVICE, MORE PREFERABLY FOR AN EXHAUST GAS TURBOCHARGER OF A MOTOR VEHICLE

(75) Inventors: Andreas Prang, Nürtingen (DE); Florian Rentz, Benningen A. N. (DE)

(73) Assignee: Bosch Mahle Turbo Systems GmbH Co. KG (DE)

( * ) Notice: Subject to any disclaimer, the term of this patent is extended or adjusted under 35 U.S.C. 154(b) by 762 days.

(21) Appl. No.: 12/702,544

(22) Filed: Feb. 9, 2010

(65) Prior Publication Data

US 2010/0215482 A1    Aug. 26, 2010

(30) Foreign Application Priority Data

Feb. 11, 2009   (DE) .......................... 10 2009 008 531

(51) Int. Cl.
*F04D 29/56* (2006.01)

(52) U.S. Cl.
USPC ........................................................ 415/160

(58) Field of Classification Search
USPC ......... 415/148, 151, 159, 160, 163, 164, 165, 415/166; 251/251
See application file for complete search history.

(56) References Cited

U.S. PATENT DOCUMENTS

| | | | |
|---|---|---|---|
| 7,431,560 B2 * | 10/2008 | Sterner | 415/164 |
| 8,021,106 B2 | 9/2011 | Battig | |
| 2002/0098081 A1 | 7/2002 | Ertl et al. | |
| 2004/0055297 A1 * | 3/2004 | Allmang et al. | 60/602 |
| 2007/0231125 A1 * | 10/2007 | Oeschger et al. | 415/160 |
| 2008/0075582 A1 | 3/2008 | Sausse et al. | |
| 2008/0240906 A1 * | 10/2008 | Barthelet et al. | 415/148 |
| 2009/0142185 A1 | 6/2009 | Fath et al. | |

FOREIGN PATENT DOCUMENTS

| | | |
|---|---|---|
| DE | 10238412 A1 | 3/2004 |
| DE | 102004023214 A1 | 12/2005 |
| DE | 102004043928 A1 | 4/2006 |
| EP | 1227221 A2 | 7/2002 |
| EP | 1398463 A1 | 3/2004 |
| EP | 1564380 A1 | 8/2005 |
| EP | 1722073 A1 | 11/2006 |
| EP | 1811135 A1 | 7/2007 |
| JP | 2008303790 A * | 12/2008 |
| WO | WO-2007112910 A1 | 10/2007 |

OTHER PUBLICATIONS

Machine Translation of JP2008303790 A Dec. 18, 2008.*

(Continued)

*Primary Examiner* — Edward Look
*Assistant Examiner* — Maxime Adjagbe
(74) *Attorney, Agent, or Firm* — Rader, Fishman & Grauer PLLC

(57) ABSTRACT

The invention relates to a charging device, more preferably an exhaust gas turbocharger for a motor vehicle with a variable turbine/compressor geometry (1) with a plurality of adjustable guide blades, which are each engaged with an adjusting ring (2) via a corresponding lever (3, 3') and which are preferentially jointly adjustable through said adjusting ring. Through a reinforcement (10) of a plurality of engagement regions (7, 7') of the adjusting ring (2) which are in contact with an adjusting lever (3, 3') each, higher force transmission from the adjusting ring (2) to the adjusting levers (3, 3') is made possible without disadvantageous plastic deformation of the adjusting ring (2) or of the adjusting levers (3, 3').

19 Claims, 2 Drawing Sheets

(56) References Cited

OTHER PUBLICATIONS

Figure 1:
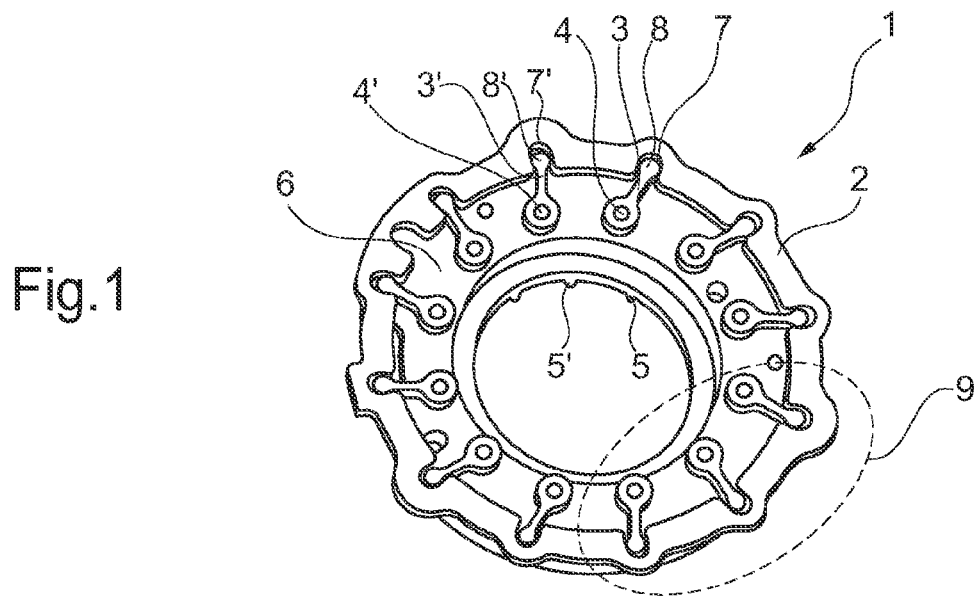

European Search Report for EP-10150408.2.
English Abstract provided for DE10238412 A1.
English Abstract provided for DE102004043928.
English Abstract provided for DE102004023214.
English Abstract provided for EP1564380.
English Abstract provided for EP1398463.
German Search Report 10 2009 008 531.9.
Boge, M.: Mechanik und Festigkeitslehre, Friedr. Vieweg & Sogn, Braunschweig/Wiesbaden, 17.Aufl., ISBN 3-528-44010-0, S.239, 243-245 (6 pages).
ABC Naturwiessenschaft und Technik, Harri Deutsch, Thun und Frankfurt/Main, 13.Aufl., Leipzig:Edition, 1980, Stichwort: "Verschleib" (4 pages).
Frungel,W.,u.a.: Metall und Elektrotechnik in Ubersicht, Volk und Wissen Volkseigener Verlag, Berlin, 1967, (Einfuhrung in die sozialistische Produktion), S.68, "Doppelschraubenschlussel", "Stauchen", S.47 (4 pages).

* cited by examiner

ADJUSTING RING FOR A CHARGING DEVICE, MORE PREFERABLY FOR AN EXHAUST GAS TURBOCHARGER OF A MOTOR VEHICLE

The invention relates to a turbocharger, more preferably an exhaust gas turbocharger for a motor vehicle with a variable turbine/compressor geometry with the features of the preamble of claim 1. In addition, the invention relates to a method for producing an adjusting ring that can be used in the turbocharger.

From DE 102 38 412 A1 a turbocharger with a variable turbine geometry of a combustion engine, more preferably a motor vehicle, is known. Here, a plurality of guide blades is arranged in a hinged manner on a guide blade carrier of the variable turbine geometry which guide blades are each associated with an adjusting lever. With an adjusting ring that interacts with the adjusting levers, angular precision of the guide blades relative to a flow direction can be adjusted collectively for all guide blades by rotating the adjusting ring relative to the guide blade carrier. To this end, a section of the respective adjusting lever protrudes into an engagement region of the adjusting ring.

Disadvantageous in this design is that an adjusting force is transmitted from the adjusting ring to the guide blade lever via a line contact. Here, a quantity of the line contact is responsible for a maximum force, which the adjusting ring can exert on the guide blade lever without plastic deformations of the guide blade lever and/or the adjusting ring occurring.

The present invention deals with the problem of stating an improved or at least another embodiment for a turbocharger with a variable turbine/compressor geometry and for a method for producing an adjusting ring that can be used in a turbocharger, which more preferably is characterized in that between the adjusting ring and the guide blade levers, greater forces can be transmitted without plastic deformations of the adjusting ring and/or the guide blade lever occurring.

According to the invention, this problem is solved through the subjects of the independent claims. Advantageous embodiments are the subject of the dependent claims.

The invention is based on the general idea of reinforcing the adjusting ring in an engagement region that is in contact with the respective adjusting lever and/or reinforcing the adjusting levers in a section protruding into the engagement region of the adjusting ring. Since the line contact is responsible for the maximum force that can be transmitted from the adjusting ring to the adjusting lever it is practical to enlarge the line contact and/or to reinforce a line contact region of the adjusting levers and/or the adjusting ring by using loadable materials so that the forces that occur between the adjusting ring and the adjusting levers can be transmitted without plastic deformations.

Here, reinforcement of the engagement region can take the form of a bead and/or folding-up and/or profiling on an upper and/or lower side of the adjusting ring. The particular advantage here is that through material reinforcement in the area of the engagement region as described above on the one hand the line contact is increased through an extension of the line and higher forces can thus be transmitted and on the other hand that the overall weight of the adjusting ring has only been increased slightly, as a result of which the mass moment of inertia has also been increased only to a minor extent. Thus, increasing of the line contact is possible with slightly increased weight and increased mass inertia.

Such an adjusting ring can be produced through a method wherein the reinforcement is produced through build-up welding and/or a forming manufacturing process and/or a shaping manufacturing process such as for example metal injection moulding method. Here, the reinforcement of the adjusting ring could for example be practically formed through stamping of the adjusting ring and subsequent upsetting of a part region of the adjusting ring.

Further important features and advantages of the invention are obtained from the subclaims, from the drawings and from the corresponding figure description by means of the drawings.

It is to be understood that the features mentioned above and still to be explained in the following cannot only be used in the respective combinations stated, but also in other combinations or by themselves, without leaving the scope of the present invention.

Preferred exemplary embodiments of the invention are shown in the drawings and are explained in more detail in the following description, wherein same reference characters refer to same or similar or functionally same components.

It shows, in each case schematically:

FIG. 1 A variable turbine/compressor geometry

Figure 2:
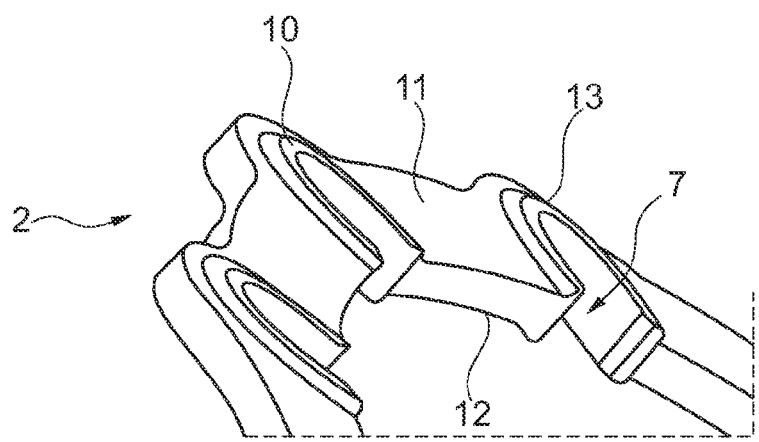
Figure 3:
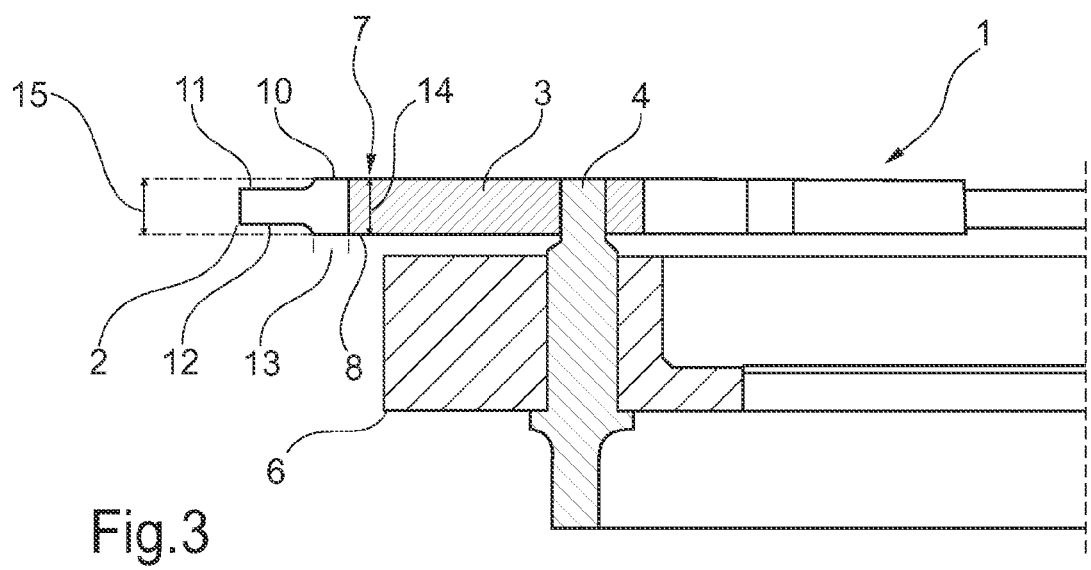
Figure 4:
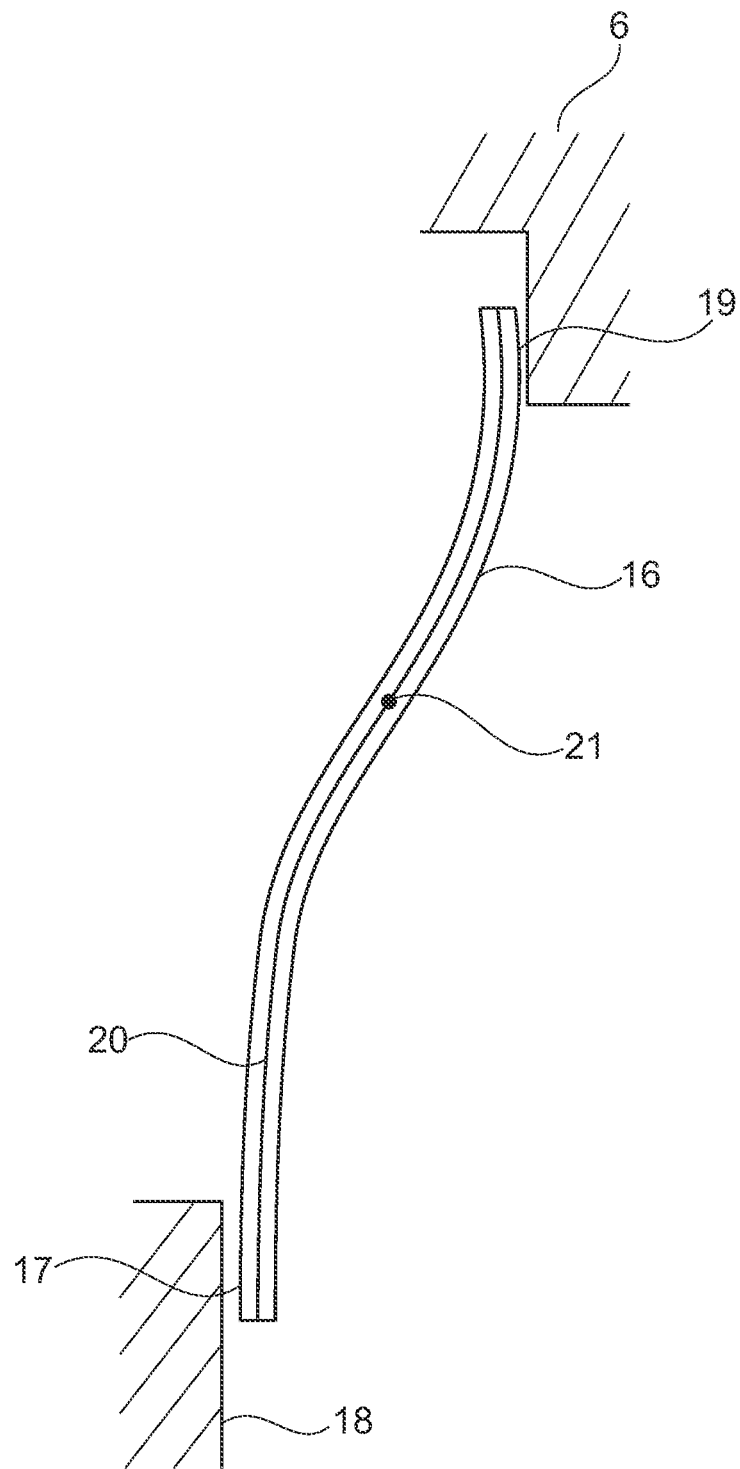

FIG. 2 A detail of an adjusting ring of a variable turbine geometry according to FIG. 1, FIG. 3 An axial section through the variable turbine geometry in the region of an adjusting lever, FIG. 4 A heat shield shaped as disc spring in installation position with a turbocharger.

According to FIG. 1, a variable turbine/compressor geometry 1 of a turbocharger comprises an adjusting ring 2 and a plurality of adjusting levers 3; 3', which are each connected in a rotationally fixed manner with a guide blade 5, 5' via a guide blade bearing pin 4, 4' each. Here, the guide blade bearing pins 4, 4' are mounted in a guide blade carrier 6. In order that all guide blades 5, 5' can be preferentially adjusted jointly, the adjusting ring 2 is equipped with a plurality of engagement regions 7, 7' into which a section 8, 8' of the respective adjusting lever 3, 3' protrudes.

A marking 9 marks an enlarged detail of the adjusting ring 2 shown in FIG. 2. According to FIG. 2, an adjusting ring 2 reinforced in the engagement region 7 comprises a raised reinforcement 10 on an upper side 11 and a lower side 12 of the adjusting ring 2. It is also conceivable to form the raised reinforcement 10 for example as profiling and/or as bead and/or folded up only on one side 11, 12 if required.

In this case, such a separate component has to be connected with the adjusting ring 2 for example through welding or a slot and key design. Here it is particularly advantageous to use a material of higher load capacity for the separate component. This makes it possible producing the adjusting ring 2 from more favourable materials and using the more expensive materials of higher value only in the part region 13 of the adjusting ring 2.

In addition it is practical in a plane defined by the upper side 11 or the lower side 12 of the adjusting ring 2 to configure the reinforcement 10 so wide that it amounts to at least 2% of the smallest width of the engagement region 7. According to FIG. 3 it is practical that a height 14 of a section 8 of the adjusting lever 3 protruding in the respective engagement region 7 corresponds to a height 15 of the reinforced engagement region 7. In this case the line contact is extended and thus optimized.

In a further embodiment the height 15 of the respective reinforced engagement region 7 is to be greater than the height 14 of the section 8 of the adjusting lever 3 protruding into the respective engagement region 7. Here, the height 14 is to amount to at least 80% of the height 15. This design takes into account any material irregularities in the marginal areas of the engagement region 7 that may occur.

The reinforcement 10 according to the invention can be produced through build-up welding and/or a forming as well as a shaping manufacturing process. A metal injection moulding method is for example conceivable as a shaping manufacturing process.

It is likewise practical to produce the engagement region 7 through stamping of the adjusting ring 3. Subsequent axial upsetting of the adjusting ring 2, wherein the part region 13, in each case about the engagement region 7 of the adjusting ring 2, is excluded from the upsetting process, then results in a raised reinforcement 10 on the upper side 11 and/or on the lower side 12 of the adjusting ring 2 in the vicinity of the engagement regions 7 with this method thus described.

According to FIG. 4, a further embodiment of the turbocharger comprises a heat shield 16 in form of a disc spring. Here, the heat shield 16 supports itself on a bearing housing 18 with a first support surface 17 and on the guide blade carrier 6 with a second support surface 19. It is advantageous if the support surfaces 17, 19 of the heat shield 16 are formed parallel to each other.

When cutting through the axis of rotation of the heat shield 16 shaped like a perforated disc two cut surfaces are created each of which has a centre line 20. Here, the centre line 20 should have a turning point 21.

LIST OF REFERENCE CHARACTERS

1 Variable turbine/compressor geometry
2 Adjusting ring
3, 3' Adjusting lever
4, 4' Guide blade bearing pin
5, 5' Guide blade
6 Guide blade carrier
7, 7' Engagement region
8, 8' Section
9 marking
10 (raised) reinforcement
11 Upper side
12 Lower side
13 Part region
14 Height of the adjusting lever section
15 Height of the engagement region
16 Heat shield
17 First support surface
18 Bearing housing
19 Second support surface
20 Centre line
21 Turning point

The invention claimed is:

1. An exhaust gas turbocharging device, comprising: a variable turbine/compressor, wherein the turbine/compressor includes a plurality of adjustable guide blades, each of which is engaged in an adjusting ring via a corresponding lever, wherein said adjusting ring has an inner perimeter and an outer perimeter, wherein said guide blades are jointly adjustable through said adjusting ring, wherein at least the adjusting ring is reinforced in an engagement region that is in contact with the respective adjusting levers, and wherein the engagement region extends from an opening at the inner perimeter of the adjusting ring radially outwardly toward the outer perimeter of the adjusting ring, and wherein the reinforcement of the engagement region is a separate component that is fixed to the adjusting ring, wherein the reinforcement is a raised reinforcement that extends on an upper and a lower side of the adjusting ring in a vicinity of the engagement region.

2. The turbocharging device according to claim 1, wherein the reinforcement of the engagement region is at least one of a bead, a folded up and a profiling on at least one of an upper and a lower side of the adjusting ring.

3. The turbocharging device according to claim 2 wherein at least one plane is defined by at least one of the upper and the lower side of the adjusting ring, and wherein the width of the reinforcement is at least 2% of the smallest width of the engagement region.

4. The turbocharging device according to claim 1, wherein a height of a section of the adjusting lever protruding into the respective engagement region corresponds to a height of the reinforced engagement region.

5. The turbocharging device according to claim 1, wherein a height of the section of the adjusting lever protruding into the respective engagement region corresponds to at least 80% of the height of the reinforced engagement region.

6. The turbocharging device according to claim 1, wherein at least one plane is defined by at least one of the upper and the lower side of the adjusting ring, and wherein the width of the reinforcement is at least 2% of the smallest width of the engagement region.

7. The turbocharging device according to claim 2, wherein a height of a section of the adjusting lever protruding into the respective engagement region corresponds to a height of the reinforced engagement region.

8. The turbocharging device according to claim 2, wherein a height of the section of the adjusting lever protruding into the respective engagement region corresponds to at least 80% of the height of the reinforced engagement region.

9. The turbocharging device according to claim 1, wherein the engagement region extends radially outwardly from the outer perimeter of the adjusting ring.

10. The turbocharging device according to claim 1, wherein a height of the engagement region is greater than a height of a section of the lever protruding into the engagement region.

11. A method for producing a turbocharging adjusting ring, comprising: constructing a turbocharger adjusting ring reinforcement area by at least one manufacturing process of welding, forming and shaping the reinforcement area, wherein the reinforcement area is disposed along an engagement region that is in contact with the respective adjusting levers and wherein the engagement region extends from an opening at the inner perimeter of the adjusting ring radially outwardly toward the outer perimeter of the adjusting ring, wherein a height of the engagement regions is greater than a height of a section of the adjusting levers protruding into the respective engagement regions wherein the engagement of the reinforcement area is a separate component that is fixed to the adjusting ring and wherein the separate component is a material that is different from that of the adjusting ring.

12. An exhaust gas turbocharging device, comprising: a variable turbine/compressor, wherein the turbine/compressor includes a plurality of adjustable guide blades, each of which is engaged in an adjusting ring via a corresponding lever, wherein said guide blades are jointly adjustable through said adjusting ring, wherein at least the adjusting ring is reinforced in an engagement region that is in contact with the respective adjusting levers, and wherein the reinforcement is a raised reinforcement that extends on an upper and a lower side of the adjusting ring in a vicinity of the engagement region.

13. The turbocharging device according to claim 12, wherein the reinforcement of the engagement region is a separate component that is fixed to the adjusting ring.

14. The turbocharging device according to claim 12, wherein a height of the engagement region is greater than a height of a section of the lever protruding into the engagement region.

15. The turbocharging device according to claim 12, wherein the reinforcement of the engagement region is at least one of a bead, a folded up and a profiling on at least one of an upper and a lower side of the adjusting ring.

16. An exhaust gas turbocharging device, comprising: a variable turbine/compressor, wherein the turbine/compressor includes a plurality of adjustable guide blades, each of which is engaged in an adjusting ring via a corresponding lever, wherein said guide blades are jointly adjustable through said adjusting ring, wherein at least the adjusting ring is reinforced in an engagement region that is in contact with the respective adjusting levers, and wherein the engagement region is a separate component from the adjusting ring, and a material of the separate component and a material of the adjusting ring are different materials.

17. The turbocharging device according to claim 16, wherein the reinforcement is a raised reinforcement that extends on an upper and a lower side of the adjusting ring in a vicinity of the engagement region.

18. The turbocharging device according to claim 16, wherein the material of the separate component has a higher load capacity than the material of the adjusting ring.

19. A method for producing a turbocharging adjusting ring, comprising: constructing a turbocharger adjusting ring reinforcement area by at least one manufacturing process of welding, forming and shaping the reinforcement area, wherein the reinforcement area is disposed along an engagement region that is in contact with the respective adjusting levers and wherein the engagement region extends from an opening at the inner perimeter of the adjusting ring radially outwardly toward the outer perimeter of the adjusting ring, wherein a height of the engagement regions is greater than a height of a section of the adjusting levers protruding into the respective engagement regions, wherein the reinforcement area includes a raised reinforcement that extends on an upper and lower side of the adjusting ring in a vicinity of the engagement region.

* * * * *